March 29, 1960  F. J. P. J. BURGER ET AL  2,930,951
ELECTRICAL CAPACITOR
Filed July 8, 1957
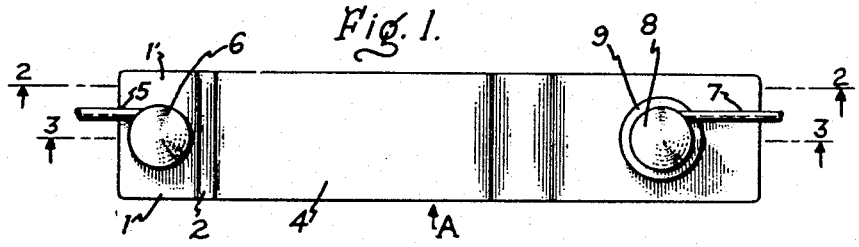
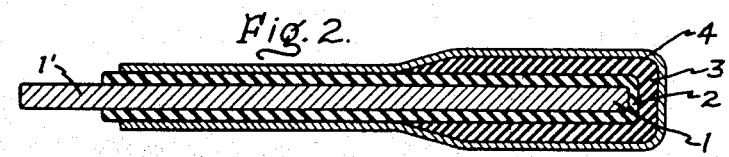
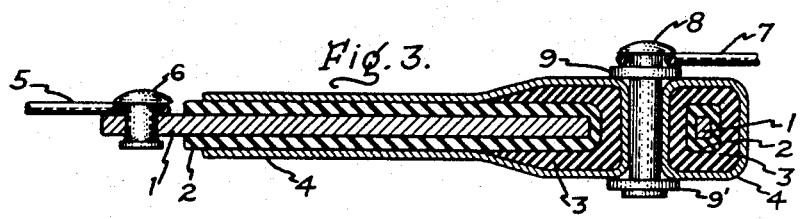
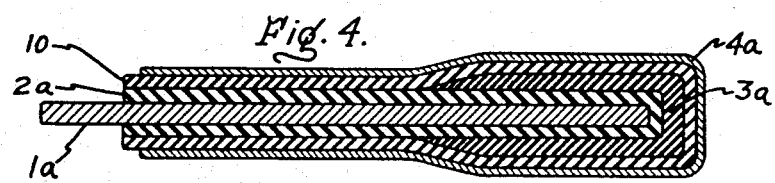
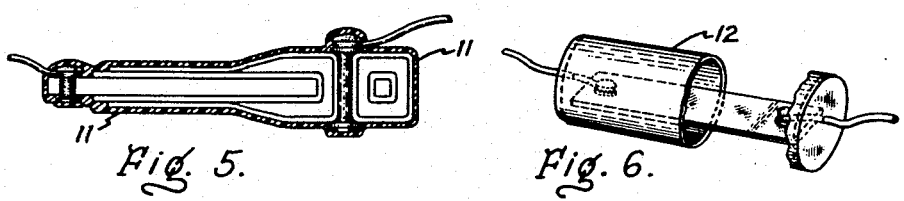
Inventors,
Francis J. P. J. Burger,
Harry H. Hilton,
by Gilbert P. Tarleton
Their Attorney.

United States Patent Office 2,930,951
Patented Mar. 29, 1960

2,930,951
ELECTRICAL CAPACITOR

Francis J. P. J. Burger and Harry H. Hilton, Glens Falls, N.Y., assignors to General Electric Company, a corporation of New York Application July 8, 1957, Serial No. 670,454
8 Claims. (Cl. 317—242)

The present invention relates to electrical capacitors, and more particularly to an improved dry type electrical capacitor and method of producing the same.

Conventional electrolytic capacitors utilizing liquid electrolytes have several drawbacks, largely due to the possibility of leakage or evaporation of the contained electrolyte. Escape of the electrolyte frequently leads to deterioration of the operating efficiency of the capacitor, results in corrosion of the casing and other metal parts, and causes other detrimental effects.

To avoid these difficulties, several attempts have been made in the past to construct solid, dry types of capacitors wherein one electrode is a filming metal on which an oxide film is anodically formed to serve as the capacitor dielectric, and an electrically conductive layer is deposited over the dielectric oxide film to serve as the second electrode. The prior types of such solid capacitors, however, have not been found fully satisfactory in practice for a variety of reasons. A principal difficulty encountered is the problem of making a secure electrical and mechanical connection between the thin deposited electrode layer and the conducting lead. Previously attempts at solving this difficulty have included the use of organic or synthetic resins as reinforcing materials for the terminal contact area, or the use of metal reinforcement, e.g., solder or the like, in this area. But these modifications did not in genreal prove suitable, since the organic reinforcement materials failed at elevated temperature, and the application of metal reinforcement material frequently caused short circuits at the terminal region due to the extreme thinness of the dielectric film separating the two electrodes. The provision of thicker dielectric films to overcome this drawback would not effectively solve the problem, since increasing the strength of the dielectric film by making it thicker would be at the cost of corresponding reduction of the capacitance of the device.

It is an object of the invention to provide an improved electrical capacitor which overcomes the above disadvantages of known types of capacitors.

It is another object of the invention to provide a solid, dry type electrical capacitor having high electrical efficiency over a wide range of operating conditions which is economical to produce.

It is a further object of the invention to provide an electrical capacitor of the above type having an improved terminal structure which ensures good electrical connection to the respective electrodes of the capacitor while avoiding electrical breakdown of the terminal contact areas.

It is still another object of the invention to provide a method of making electrical capacitors of the above type which is readily and economically carried out and which provides an improved terminal structure without sacrifice of the electrical efficiency of the capacitor.

Other objects and advantages will become apparent from the following description and the appended claims.

With the above objects in view, the present invention relates to an electrical capacitor comprising a first electrode layer, a thin anodic dielectric oxide layer overlying a major portion of the surface of the first electrode layer, a second anodic oxide film overlying a minor portion of the surface of the first electrode layer, the second anodic oxide film being substantially thicker than the first anodic oxide layer, and a second electrode layer overlying both anodic oxide layers and spaced thereby from the first electrode layer.

The thicker oxide layer described provides mechanical and electrical reinforcement in the terminal contact region where a conductive lead may be securely attached to the capacitor device in good electrical connection with the second electrode layer, which is normally in the form of a very thin conductive coating. At the same time, the thin, dense oxide layer over a major portion of the device serves to produce high capacitance in the capacitor without being subjected to the stresses required for good electrical connection of the leads to the electrodes. A significant feature of the invention is the anodic formation of both the dielectric layers, the different thicknesses being obtained by selective formation of the dielectric layers in different types of film-forming electrolytes.

The invention will be better understood from the following description taken in conjunction with the accompanying drawing, in which:

Fig. 1 is a plan view of an embodiment of a capacitor device constructed in accordance with the present invention;

Fig. 2 is a cross-sectional view in exaggerated scale of the Fig. 1 device taken along the line 2—2;

Fig. 3 is a cross-sectional view of the Fig. 1 device taken along the line 3—3;

Fig. 4 is a cross-sectional view of a modification of the Fig. 1 device;

Fig. 5 is a view of the device which includes one form of moisture impervious enclosure;

Fig. 6 is a view, partly broken away, of the present device including a different form of moisture impervious enclosure; and Fig. 7 shows a multiple unit arrangement incorporating capacitor units constructed in accordance with the invention.

Referring now to the drawnig, and particularly to Figs. 1–3 there is shown a solid, dry type capacitor unit A constructed in accordance with the invention, which comprises a plate 1 of aluminum serving as one electrode of the capacitor. Preferably, the aluminum of which plate 1 is composed of is of high purity and desirably though not necessarily is of at least 99.97% pure aluminum. Instead of being of solid aluminum, the base plate 1 may be of any suitable material having a coating of aluminum thereon.

Formed over the major portion of the surface of electrode plate 1 is a thin, anodically deposited, aluminum oxide dielectric film 2, with an end portion 1' of plate 1 being left free of oxide film to serve as the terminal region for electrode plate 1. Over the opposite terminal end portion of the capacitor device as shown, there is formed a second anodic oxide layer 3 which is relatively thick, hard, porous aluminum oxide material, as compared to the very thin, dense aluminum oxide film 2 constituting the principal dielectric layer of the capacitor.

Deposited over the oxide layers 2 and 3 is a thin metallic layer 4 which may be of the same aluminum composition of the plate electrode 1, or any other suitable conducting material such as tin, silver, copper, lead, zinc or non-metallic solid conductive materials such as carbon and may be applied by any metallizing or other suitable depositing procedures. A satisfactory metal coating may be produced, for example, by vacuum evaporation of the desired metal, or by sputtering, dipping, painting, chemical deposition, or the like. The carbon electrode layer may be formed by applying a coating of a dispersion of finely divided graphite, such as by painting or dipping and thereafter drying and baking the coating. This provides a particularly economical method of forming the outer electrode. As shown the end portions of oxide dielectric film 2 are left free of the metal electrode material 4 by the use of suitable masking means such as a coating of varnish wax or shield to avoid the possibility of a short circuit between the two electrodes.

Lead 5 is firmly secured in electrical connection with electrode plate 1 by rivet 6 or the like which passes through the uncoated terminal portion of plate 1. Lead 7 is similarly connected to electrode layer 4 by rivet 8 and washers 9, 9', the latter elements being interposed in direct contact with electrode layer 4 as shown in Fig. 3. As is evident from Fig. 3, the aperture for rivet 8 is made in plate 1 prior to subjecting the electrode plate to the described film forming and metallizing procedures so that rivet 8 is separated from the electrode plate 1 by the superposed oxide and metal coatings and thereby prevented from causing a short circuit between the electrodes.

The thicknesses of the layers of the device illustrated are shown in exaggerated scale for the purposes of clarity, and the relative dimensions of the parts as shown, except as otherwise specifically mentioned, are not necessarily those used in practice. In a practical device, the thicknesses of the various parts may typically be as follows: electrode plate 1, 40 mils; thin dielectric oxide film 2, 1 to 2 microns; thick porous oxide film 3, 30 microns; and the metal electrode layer 4, 0.3 micron.

Of particular significance is the provision in accordance with the invention of the two different oxide layers 2 and 3, each having characteristics designed to meet their particular function in the capacitor. Oxide layer 3 is deposited in the terminal region i.e., where the lead 7 is to be fixed, by anodizing this portion of the plate 1 in a solution of film-forming electrolyte in which the anodic aluminum oxide film is somewhat soluble. Such electrolytes are, for example, oxalic acid, dilute sulfuric acid, and sulfamic acid. Although the reaction between such film-forming electrolytes and the aluminum oxide film formed thereby is not completely known, it appears that the oxide layer is porous as it is being formed, due presumably to its partial solution in the electrolyte. Because of its porous nature, the film permits continued penetration of the electrolyte to the surface of the aluminum plate 1 for further reaction therewith so as to increase the thickness of the aluminum oxide film being formed.

On the other hand, the thin dielectric oxide layer 2 is formed in accordance with conventional capacitor electrode film-forming procedures whereby a very thin, dense anodic oxide layer is produced on the surface of the electrode. The forming electrolytes used for this purpose may comprise, for example, boric acid, tartaric acid, phosphoric acid and salts thereof, glyco-borates, or citric acid, or such other known film-forming electrolytes as have little or no solvent action on the aluminum material of the electrode plate. The film formed by such electrolytes is a non-porous, dense barrier-type layer, and after being formed to a certain extent, the film resists further oxide formation (anodization) necessitating constantly increasing voltages to produce further anodic reaction. In addition to the above differences, the relatively thick aluminum oxide layer 3 further is found to be substantially stronger and much more resistant to abrasion than the thin dielectric oxide film 2.

By providing a relatively thick hard oxide such as constituted by layer 3 at the terminal portion, a thicker metallized electrode layer can be deposited over that portion while avoiding danger of subsequent electrical breakdown at that point, and because it is thicker at the terminal contact point, the metallized layer is less subject to burning away (clearing) which would cause an open circuit there. This is especially desirable since at this point concentration of the current is relatively high, especially under "clearing" conditions.

Since the main dielectric layer 2 need not in view of the above contribute to reinforcement of the terminal region, it may be formed in an extremely thin film thereby increasing the capacitance of the capacitor. The conducting electrode 4 deposited overlying a suitable portion of the previous dielectric layers may be made sufficiently thin to enable clearing of conducting faults in the dielectric films by local vaporization or oxidation of the deposited electrode layer 4 when a suitable voltage is applied. Such clearing may occur under actual operating conditions.

Preferably the terminal oxide layer 3 is produced in a wedge form with the thin end gradually tapering into and merging with the main dielectric layer 2. This configuration ensures a smooth transition point on which the metallic layer 4 may be uniformly deposited and thereby avoids an irregular base which may be difficult to properly metallize and which might result in a gap in the electrode layer or a region susceptible to electrical breakdown.

The following is a typical method of producing capacitors of the described construction in accordance with the present invention it being understood that the invention is in no way limited by the specific process or compositions set forth. It is desirable to initially properly clean and polish the surfaces of the base aluminum sheet especially around the edges of the sheet and of the rivet-receiving apertures. Before the anodizing treatment is initiated the electrode plate may be etched in accordance with known processes to increase the effective area of the sheet. The thus treated sheet is then made the anode in an aqueous forming bath of about 3% oxalic acid with only the terminal end portion immersed in the bath for forming the thick terminal oxide portion. To form the desired wedge shape of this oxide portion the electrolyte solution is preferably agitated to produce a ripple in the bath, which results in the tapering formation sought, or the sheet may be gradually withdrawn from the electrolyte. Typically, a D.C. voltage between 50 and 100 volts is applied in this forming step for a sufficient period to produce the desired thickness of the aluminum oxide film.

Following this treatment and after being rinsed, the sheet is then anodized in an aqueous 10% boric acid solution with the entire specimen immersed except for the opposite, previously unanodized terminal end portion (region 1'). The forming voltage used in this procedure may be increased to a voltage of, say, 500 volts, while the current is allowed to drop from an initial value of about 500 milliamps, the formation being continued until a minimum leakage current is attained, after which the specimen is rinsed and ready for metallizing.

As will be observed from the drawing, the thin barrier-type dielectric layer 2 forms over the major portion of the aluminum sheet in contact with the latter even in the region of the previously formed thick terminal oxide layer 3 with which it appears to become integrated. This occurs because the boric acid electrolyte is able, due to the porosity of the thick oxide layer 3, to penetrate the latter and reach the aluminum electrode plate 1 at its base to react therewith and anodically form on its surface the thin barrier layer 2.

The thus anodized aluminum sheet is then exposed to a metallizing operation, e.g., by exposing both sides to vacuum evaporation of high purity aluminum, care being taken to mask suitably the end portion of the unit so that the metal coating 4 extends short of the end of the thin oxide coating 2. A suitable minimum coating density for the metallized layer has been found to be about 0.6 to 0.8 mg. per square inch of actual surface area covered. Thinner coatings appear to result in capacitance which decreases gradually with time.

The lead wires are thereafter preferably secured by means of rivets, as shown in the drawing, or equivalent fastening means. The aluminum washers 9, 9' are used for making actual contact to the metallized layer 4, and since it is important to ensure that there are no burrs or sharp edges on the washers, the latter elements are subjected to a polishing treatment similar to that used for the base electrode plate.

Although the rivet connecting structure shown and described, or similar fasteners such as bolts, or the like, have proved quite satisfactory in the present capacitor device for providing good electrical and mechanical connection between the leads and the capacitor, the invention is not limited to such connecting means. The lead wires may, for example, merely be suitably wound or clamped around the terminal portions of the capacitor without rivets or teminal apertures being provided as shown, or any other suitable lead connecting means such as soldering or the like may be used.

After assembly, it is desirable to clear the capacitor by applying a D.C. voltage rising in steps to a desired voltage.

The device described above may be further modified, if desired, as shown in Fig. 4 by interposing a layer of a semi-conducting oxide material 10, such as $MnO_2$, between the thin aluminum oxide dielectric layer 2a and the outer metallized electrode layer 4a. Experiments indicate that the use of such intermediate layer of semi-conductive oxide material may enable the capacitor to withstand higher operating voltages and increase the stability of capacitance and power factor characteristics.

For full efficiency under operating conditions where moisture may be a factor, it is preferable that the present capacitor device be protected from the action of water vapor. To this end the device may be encapsulated or enclosed by a suitable outer protective means. In one form, as shown in Fig. 5, the device may be provided with an outer enveloping coating 11 of a suitable moisture impervious composition having a thickness, say, of the order of 40 mils. Silicone resin coating compounds are particularly suitable for this purpose, especially where high operating temperatures are encountered, but various other known types of moisture impervious coating materials such as polyethylene glycol terephthalate resin or epoxy resin may be used where appropriate.

Alternatively, the capacitor may be enclosed as shown in Fig. 6, hermetically sealed within a suitable moisture impervious container 12 made of metal, glass, ceramic or other material, the capacitor assembly being suspended on its opposite leads which pass through end discs fluid-tightly sealing the interior of the container.

The disclosed capacitor device may be used as a single unit A, as shown in Figs. 1–6, or a plurality of such units. A may be assembled with the units connected in parallel or in series. Fig. 7 shows a parallel assembly of stacked units connected by rivets 14, 15. If necessary, metallic inserts may be placed between the adjacent electrode portions for better electrical contact between the units.

While shown in the form of rigid elongated rectangular plate, the capacitor unit may be made in other forms without going beyond the scope of the present invention. For example, plates of any desired thickness or configuration may be used, or the capacitor may be a flexible sheet in flat, cylindrical, or helically or convolutely wound condition, or it may be in the form of a wire (coiled or shaped), and the metal used may be sintered, etched or in other forms which increase the effective area.

While the present invention has been described with reference to particular embodiments thereof, it will be understood that numeous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising a first aluminum electrode layer having a first terminal portion, a thin anodic aluminum oxide dielectric layer overlying a major portion of the surface of said first aluminum electrode layer, a second anodic aluminum oxide dielectric layer overlying only said first terminal portion of the surface of said first aluminum electrode layer, said second oxide dielectric layer being at least several times thicker than said first oxide dielectric layer, a second electrode layer overlying both said oxide dielectric layers and spaced thereby from said first aluminum electrode layer, said first electrode layer having an uncoated second terminal portion, and means for securing leads in electrical connection to said first aluminum electrode layer at its uncoated terminal portion and to said second electrode layer in the region of said second anodic oxide dielectric layer, whereby said thicker oxide layer provides substantial resistance against mechanical and electrical stress to avoid electrical breakdown at said first terminal portion.

2. An electrical capacitor comprising a sheet of aluminum constituting a first electrode having a first terminal portion, a thin, dense anodic aluminum oxide dielectric layer overlying a major portion of opposite sides of said aluminum sheet a second anodic aluminum oxide dielectric layer superposed on said thin oxide layer only on said first terminal portion of opposite sides of said aluminum sheet said second anodic oxide dielectric layer being porous and at least several times thicker than said thin, dense anodic oxide dielectric layer, a metallized layer constituting a second electrode on opposite sides of said aluminum sheet overlying both said oxide dielectric layers and spaced thereby from said first electrode, and means for securing conducting leads in electrical connection to said aluminum sheet and to said metallized layer in the region of said thicker anodic oxide dielectric layer, whereby said thicker oxide layer provides substantial resistance against mechanical and electrical stress to avoid electrical breakdown at said first terminal portion.

3. An electrical capacitor comprising a sheet of aluminum constituting a first electrode having a first terminal portion, a thin dense anodic aluminum oxide dielectric layer overlying a major portion of opposite sides of said aluminum sheet a second anodic aluminum oxide dielectric layer superposed on said thin oxide layer only on said first terminal portion of opposite sides of said aluminum sheet said second anodic oxide layer being porous and at least several times thicker than said thin, dense anodic oxide dielectric layer, a metallized layer constituting a second electrode on opposite sides of said aluminum sheet)overlying both said oxide dielectric layers and spaced thereby from said first electrode, said aluminum sheet having an uncoated second terminal portion, and means for securing conducting leads in electrical connection to said electrodes, said means comprising fastening means passing through said uncoated terminal portion of said aluminum sheet and through the assembly of layers in the region of said second anodic oxide layer, whereby said thicker oxide layer provides substantial resistance against mechanical and electrical stress to avoid electrical breakdown at said first terminal portion.

4. An electrical capacitor comprising a sheet of aluminum constituting a first electrode having a first terminal portion, a thin, dense anodic aluminum oxide dielectric layer overlying a major portion of opposite sides of said aluminum sheet, a second anodic aluminum oxide dielectric layer superposed on said thin oxide layer only on said first terminal portion of opposite sides of said aluminum sheet, said second anodic oxide layer being porous and at least several times thicker than said thin, dense anodic oxide dielectric layer, a metallized layer constituting a second electrode on opposite sides of said aluminum sheet overlying both said oxide dielectric layers and spaced thereby from said first electrode, means for securing conducting leads in electrical connection to said aluminum sheet, and to said metallized layer in the region of said thicker anodic oxide dielectric layer, and enclosing means enveloping and hermetically sealing the assembly of layers, whereby said thicker oxide layer provides substantial resistance against mechanical and electrical stress to avoid electrical breakdown at said first terminal portion.

5. A device as defined in claim 4, wherein said enclosing means is constituted by a moisture-impervious coating enveloping said assembly of layers.

6. A device as defined in claim 4, wherein said enclosing means is constituted by a moisture-impervious container.

7. An electrical capacitor comprising, in combination, an assembly of electrically connected capacitor units, each capacitor unit comprising a sheet of aluminum constituting a first electrode having a first terminal portion, a thin, dense anodic aluminum oxide dielectric layer overlying a major portion of opposite sides of said aluminum sheet, second anodic aluminum oxide dielectric layer superposed on said thin oxide layer only on said first terminal portion of opposite sides of said aluminum sheet, said second anodic oxide layer being porous and at least several times thicker than said thin, dense anodic oxide dielectric layer, a thin conducting layer constituting a second electrode on opposite sides of said aluminum sheet overlying both said oxide dielectric layers and spaced thereby from said first electrode, said aluminum sheet having an uncoated second terminal portion, and means for holding said units in assembly and for securing leads in electrical connection to the electrodes thereof, said means including fastening means in contact with at least certain of said units in the region of the second anodic oxide layer thereof, whereby said thicker oxide layer provides substantial resistance against mechanical and electrical stress to avoid electrical breakdown at said first terminal portion.

8. An electrical capacitor comprising a first aluminum electrode layer having a first terminal portion, a thin anodic aluminum oxide dielectric layer overlying a major portion of the surface of said first aluminum electrode layer, a layer of semi-conductive material composed of manganese dioxide superposed on said thin dielectric layer, a second anodic aluminum oxide dielectric layer superposed on said thin oxide layer only overlying said first terminal portion of the surface of the first aluminum electrode layer, said second anodic aluminum oxide dielectric layer being at least several times thicker than said first mentioned dielectric layer, and a second electrode layer overlying both said dielectric layers and spaced thereby from said first aluminum electrode layer, whereby said thicker oxide layer provides substantial resistance against mechanical and electrical stress to avoid electrical breakdown at said first terminal portion.

References Cited in the file of this patent

UNITED STATES PATENTS

| | | |
|---|---|---|
| 1,923,539 | Jenny et al. | Aug. 22, 1933 |
| 1,965,683 | Work | July 10, 1934 |
| 2,052,575 | Lilienfeld | Sept. 1, 1936 |
| 2,076,904 | Lilienfeld | Apr. 13, 1937 |
| 2,079,516 | Lilienfeld | May 4, 1937 |
| 2,174,840 | Robinson et al. | Oct. 3, 1939 |
| 2,174,841 | Robinson | Oct. 3, 1939 |
| 2,578,400 | Cohn | Dec. 11, 1951 |

FOREIGN PATENTS

| | | |
|---|---|---|
| 873,672 | France | July 16, 1942 |
| 746,584 | Germany | Aug. 30, 1944 |